FEDERHEN & SHERMAN.
Spectacles.
No. 69,554.  Patented Oct. 8, 1867.
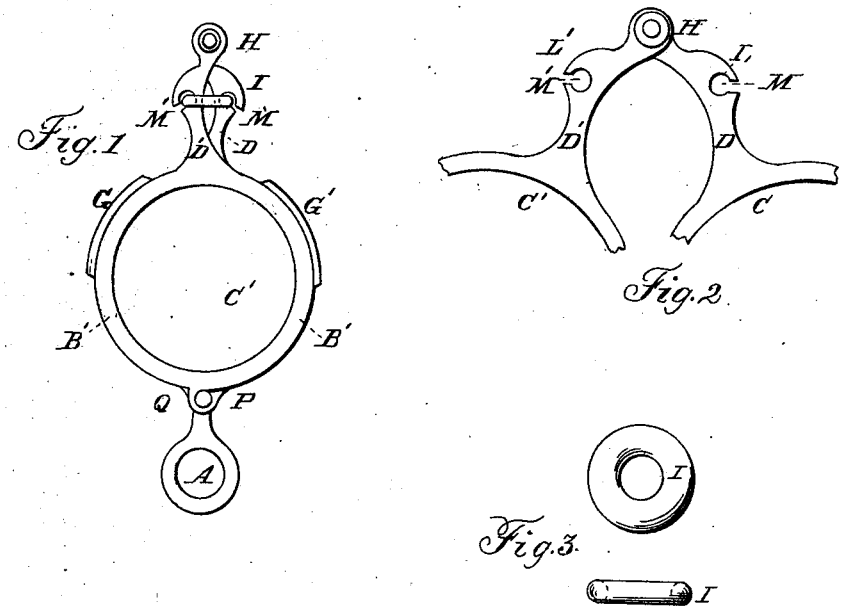
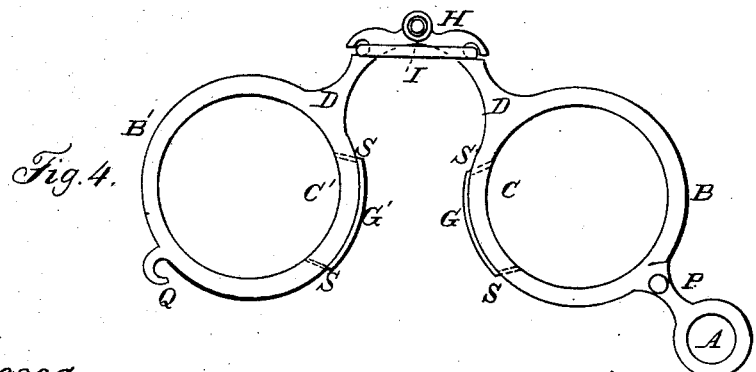
Witnesses
L. Barnett
H. Dawes Federhen
Inventors.
John Federhen
Wm C Sherman

United States Patent Office.

JOHN FEDERHEN AND WILLIAM C. SHERMAN, OF BOSTON, MASSACHUSETTS.

Letters Patent No. 69,554, dated October 8, 1867.

---

IMPROVEMENT IN DOUBLE EYE-GLASSES.

---

The Schedule referred to in these Letters Patent and making part of the same.

---

TO ALL WHOM IT MAY CONCERN:

Be it known that we, JOHN FEDERHEN and WILLIAM C. SHERMAN, of Boston, in the county of Suffolk, and State of Massachusetts, have invented a new and useful Improvement in Double Eye-Glasses; and we do hereby declare that the following is a full and exact description of the construction and mode of use of the same, reference being had to the accompanying drawings making a part of this specification.

Figure 1 represents the eye-glass closed.

Figure 2 shows the position and form of the cavity for receiving the spring.

Figure 3, section and edge views of the rubber spring.

Figure 4 shows the position of the glasses and spring when in use.

The main features of our invention are the India-rubber spring, which draws the glasses together, and the rubber band or projection on the inner edges of the bows or frame. The improvement is applicable to double eye-glasses only.

The glasses now in general use are connected together by a curved steel spring, which holds them apart from each other. When they are to be closed one of the glasses is shut over the other by the hand, and retained in position by a small pin, which lies in a hook formed on the frame. To close the glass special attention is required, and if not closed, or if it accidentally springs open, it is liable to be broken.

In our improvement the glasses C C' are closed over each other by the contraction of a small India-rubber band, I, and remain so closed when not in use, as represented in fig. 1. The arms D D', forming a part of the frame B B', turn on a pivot-joint, H. At about the middle of each of the arms there are round holes, L L', with small cuts or slots, M M', extending to the outer side of the arm. An India-rubber ring, I, having a small bore, as in fig. 3, is forced into the slot M M', and nearly fills the holes L. As these slots are very narrow the arms may be placed in any required position without allowing the rubber band to slip out. We prefer to give an outward curvature to the arms D D' for the purpose of increasing the distance from centre to centre of the holes L, thus causing the India-rubber spring to have a strong action in closing the glasses, and also insuring a convenient shape with reference to its fit upon the bridge of the nose. When closed the hook Q, upon the frame B', rests upon the pin P near the handle A of the other frame B. By the use of the spring, as herein described, the glasses are kept closed when the spring is allowed to contract, and when in use the pressure upon the nose is uniform and less rigid than in the case of a steel spring.

The other part of our invention relates to the mode of relieving the pressure upon the nose, and causing an increase of friction and adhesion for the purpose of preventing the glasses from slipping off. This is effected by the application of two small strips or cords of India rubber, G G', figs. 1 and 4, affixed to the inside of the frame B B', the rubber being of sufficient length to prevent the steel, shell, horn, or hard rubber, of which the frames are made, from touching the nose. These strips or bands may be cemented to the frames, or their ends may be drawn through holes in the frame, as at S S, fig. 4.

By the use of springs of different strength any required pressure of the glasses upon the nose is readily adjusted.

What we claim, and desire to secure by Letters Patent, is—

A double eye-glass, provided with an elastic band, attached to the arms for the purpose specified.

We also claim the pressure-bands, or elastic pads G G', attached to the inside of the frames, substantially as herein described and for the purpose specified.

JOHN FEDERHEN, [L. S.]
              WILLIAM C. SHERMAN. [L. S.]

Witnesses:
 J. E. FITZGERALD,
 GEO. W. SEARLE.